(12) United States Patent  (10) Patent No.: US 8,817,159 B2
Nagashima et al.  (45) Date of Patent: Aug. 26, 2014

(54) IMAGING APPARATUS

(75) Inventors: Mitsunori Nagashima, Kyoto (JP); Masahide Tanaka, Osaka (JP)

(73) Assignee: Rohm Co., Ltd., Kyoto (JP)

(*) Notice: Subject to any disclaimer, the term of this patent is extended or adjusted under 35 U.S.C. 154(b) by 305 days.

(21) Appl. No.: 13/351,393

(22) Filed: Jan. 17, 2012

(65) Prior Publication Data

US 2012/0182460 A1  Jul. 19, 2012

(30) Foreign Application Priority Data

Jan. 17, 2011  (JP) ................. 2011-006711

(51) Int. Cl.
*H04N 5/222* (2006.01)
*H04N 5/232* (2006.01)
*H04N 5/225* (2006.01)

(52) U.S. Cl.
CPC ............. *H04N 5/232* (2013.01); *H04N 5/2251* (2013.01)
USPC ................................... 348/333.02

(58) Field of Classification Search
CPC .................................. H04N 5/23293
USPC ......................................... 348/333.02
See application file for complete search history.

(56) References Cited

U.S. PATENT DOCUMENTS

| 5,184,114 A * | 2/1993 | Brown ............................ 345/83 |
| 8,350,943 B2 * | 1/2013 | Park ......................... 348/333.01 |
| 2004/0179091 A1 * | 9/2004 | Aoike ......................... 348/14.02 |
| 2004/0239799 A1 * | 12/2004 | Suzuki et al. ................. 348/370 |

FOREIGN PATENT DOCUMENTS

JP  2009-253669  10/2009

* cited by examiner

*Primary Examiner* — James Hannett
(74) *Attorney, Agent, or Firm* — Hamre, Schumann, Mueller & Larson, P.C.

(57) ABSTRACT

An imaging apparatus includes an imaging device, a lens provided in a front part and configured to form an image of a subject on the imaging device, a dot matrix display unit which includes a plurality of LED chips, each providing a plurality of dots, and is arranged in the front part, with a light emission state visible by the subject, and a display controller which controls display of the dot matrix display unit. The dot matrix display unit displays a pattern based on the control of the display controller.

29 Claims, 29 Drawing Sheets

| | |
|---|---|
| Area of front part of case 910 | 60.0 |
| Radius of lens unit 902 | 1.5 |
| Area of lens unit 902 | 30.0 |
| Area of self-timer lamp 904 | 0.8 |
| Ratio of self-timer lamp 904 | 1.5% |

| | |
|---|---|
| Area of front part 111 | 60.0 |
| Radius of lens unit 201 | 0.5 |
| Area of lens unit 902 | 7.1 |
| Area of dot matrix display unit 261 | 30.0 |
| Ratio of dot matrix display unit 261 | 56.7% |

| Area of front part 111 | 60.0 |
| --- | --- |
| Radius of lens unit 201 | 0.5 |
| Area of lens unit 902 | 0.8 |
| Area of dot matrix display unit 261 | 16.0 |
| Ratio of dot matrix display unit 261 | 27.0% |

| | |
|---|---|
| Area of front part 111 | 60.0 |
| Radius of lens unit 201 | 1.5 |
| Area of lens unit 902 | 7.1 |
| Area of dot matrix display unit 261 | 9.0 |
| Ratio of dot matrix display unit 261 | 17.0% |

| | |
|---|---|
| Area of front part 111 | 60.0 |
| Radius of lens unit 201 | 0.5 |
| Area of lens unit 902 | 0.8 |
| Area of dot matrix display unit 261 | 4.0 |
| Ratio of dot matrix display unit 261 | 6.8% |

| | |
|---|---|
| Area of front part 111 | 60.0 |
| Radius of lens unit 201 | 1.5 |
| Area of lens unit 902 | 7.1 |
| Area of dot matrix display unit 261 | 2.0 |
| Ratio of dot matrix display unit 261 | 3.8% |

IMAGING APPARATUS

CROSS-REFERENCE TO RELATED APPLICATION

This application is based upon and claims the benefit of priority from Japanese Patent Application No. 2011-6711, filed on Jan. 17, 2011, the entire contents of which are incorporated herein by reference.

TECHNICAL FIELD

The present disclosure relates to an imaging apparatus such as a digital camera.

BACKGROUND

FIG. 29 shows a conventional digital camera. As shown in FIG. 29, a digital camera 900 includes a case 901 which is provided with a lens unit 902, a shutter release button 903 and a self-timer lamp 904. When the shutter release button 903 is pushed, an image formed on an imaging device (not shown) such as a charge-coupled device (CCD) by means of the lens unit 902 is stored as image data produced by photoelectric conversion. If a self-timer is used to take a group photograph or the like, the self-timer lamp 904 flickers for a predetermined period of time after the shutter release button 903 is pushed. Focusing on this flickering, persons as subjects get ready to take a photograph. A photographing process is performed after the lapse of the predetermined period of time.

However, it is difficult for children to understand the intention of the flickering, although adults can properly recognize that the time the photograph will be taken is approaching with the flickering of the self-timer lamp 904. Therefore, children do not pay attention to the digital camera 900 when taking a group photograph, which may result in difficulty in taking a desirable group photograph.

SUMMARY

The present disclosure provides some embodiments of an imaging apparatus allowing children and so on to pay instinctive attention to the apparatus.

According to one aspect of the present disclosure, there is provided an imaging apparatus including an imaging device, a lens, a dot matrix display unit, and a display controller. The lens provided in a front part forms an image of a subject on the imaging device. The dot matrix display unit is arranged in the front part, and includes a plurality of LED chips, each of the plurality of LED chips providing a plurality of dots with a light emission state visible by the subject. The display controller controls display of the dot matrix display unit. The dot matrix display unit displays a pattern based on the control of the display controller.

According to another aspect of the present disclosure, there is provided an imaging apparatus including: an imaging device; a lens which forms an image of a subject on the imaging device; a front part provided with the lens; a dot matrix display unit which includes a plurality of LED chips, each being composed of a plurality of dots, and is arranged in the front part, with a light emission state visible from the subject; a focus adjustment unit which adjusts the image formation on the imaging device; and a display controller which controls display of the dot matrix display unit, wherein the display controller displays a pattern on the dot matrix display unit during the adjustment operation of the focus adjustment unit.

The focus adjustment unit may include an automatic focus adjustment unit which automatically adjusts the image formation on the imaging device, and a manual operating unit which triggers the automatic focus adjustment unit. The display controller displays a pattern on the dot matrix display unit during the operation of the manual operating unit.

In one embodiment, the imaging device further includes a manual operating unit, and a self-timer device which performs a release after a lapse of predetermined timer time after the manual operating unit is operated. The display controller which controls display of the dot matrix display unit, displays a pattern on the dot matrix display unit during the predetermined timer time.

In another embodiment, the display controller changes the pattern displayed on the dot matrix display unit during the display of the pattern.

In another embodiment, the imaging apparatus further includes a cover plate which covers the dot matrix display unit, transmits light from the dot matrix display unit, and makes the dot matrix display unit invisible to the external when the dot matrix display unit is turned off.

In another embodiment, the dot matrix display unit emits light having a color identical or similar to that of the front part.

In another embodiment, the area of the dot matrix display unit is 5% to 50% of the area of the front part excluding the lens.

In another embodiment, the display controller generates a gradation in the plurality of dots of the dot matrix display unit.

In another embodiment, the display controller changes the brightness of the plurality of dots of the dot matrix display unit continuously in time.

In another embodiment, the imaging apparatus further includes a voice output unit, and the display controller changes a display pattern of the dot matrix display unit in association with a change of voice output from the voice output unit.

In another embodiment, the imaging apparatus further includes a storage unit which stores an image generated by the imaging device, and the display controller controls the display of the dot matrix display unit based on the image stored in the storage unit.

In another embodiment, the imaging apparatus further includes an image processing unit which processes the image generated by the imaging device, and the display controller controls the display of the dot matrix display unit based on the image processed by the image processing unit.

In another embodiment, the imaging apparatus further includes a pattern storage unit in which a plurality of portrait patterns is pre-stored, and the display controller selects portrait patterns from the plurality of portrait patterns based on the image processed by the image processing unit and displays the selected portrait patterns on the dot matrix display unit.

In another embodiment, the imaging apparatus has a portrait registration mode in which the portrait patterns are stored in the pattern storage unit based on the image processed by the image processing unit.

In another embodiment, the imaging apparatus further includes a voice input unit through which voice is input, and, in the portrait registration mode, the voice input from the voice input unit is stored in the pattern storage unit in association with the portrait patterns.

According to yet another aspect of the present disclosure, there is provided an imaging apparatus including: an imaging device; a lens which forms an image of a subject on the imaging device; a front part provided with the lens; a dot matrix display unit which includes a plurality of LED chips, each being composed of a plurality of dots, and is arranged in the front part, with a light emission state visible by the subject; an image processing unit which processes an image generated by the imaging device; and a display controller which controls display of the dot matrix display unit, wherein the display controller has a self-photographing mode to display a pattern on the dot matrix display unit based on the image processed by the image processing unit.

In one embodiment, the image processing unit extracts a facial contour from the image generated by the imaging device and the display controller controls the dot matrix display unit to display the facial contour.

According to still another aspect of the present disclosure, there is provided an imaging apparatus including: an imaging device; a lens which forms an image of a subject on the imaging device; a front part provided with the lens; a dot matrix display unit which includes a plurality of LED chips, each being composed of a plurality of dots, and is arranged in the front part, with a light emission state visible by the subject; a display controller which controls display of the dot matrix display unit; and a gravity direction sensor which detects gravity direction, and the display controller has a self-photographing mode to display an indicator indicating the gravity direction or a horizontal direction perpendicular to the gravity direction on the dot matrix display unit.

In another embodiment, the aspect ratio of the dot matrix display unit is equal to the aspect ratio of the image generated by the imaging device.

According to still another aspect of the present disclosure, there is provided an imaging apparatus including: an imaging device; a lens which forms an image of a subject on the imaging device; a front part provided with the lens; a dot matrix display unit which includes a plurality of LED chips, each being composed of a plurality of dots, and is arranged in the front part, with a light emission state visible by the subject; and a display controller which controls display of the dot matrix display unit, wherein the area of the dot matrix display unit is 5% to 50% of the area of the front part excluding the lens.

According to still another aspect of the present disclosure, there provided an imaging apparatus including: an imaging device; a lens which forms an image of a subject on the imaging device; a front part provided with the lens; a dot matrix display unit which includes a plurality of LED chips, each being composed of a plurality of dots, and is arranged in the front part, with a light emission state visible by the subject; a display controller which controls display of the dot matrix display unit; and a voice output unit, wherein the display controller changes a display pattern of the dot matrix display unit in association with a change of voice output from the voice output unit.

Other features and advantages of the present disclosures will be more apparent from the following detailed description in conjunction with the accompanying drawings.

DETAILED DESCRIPTION

Some embodiments of the present disclosure will now be described in detail with reference to the drawings.

Figure 1:
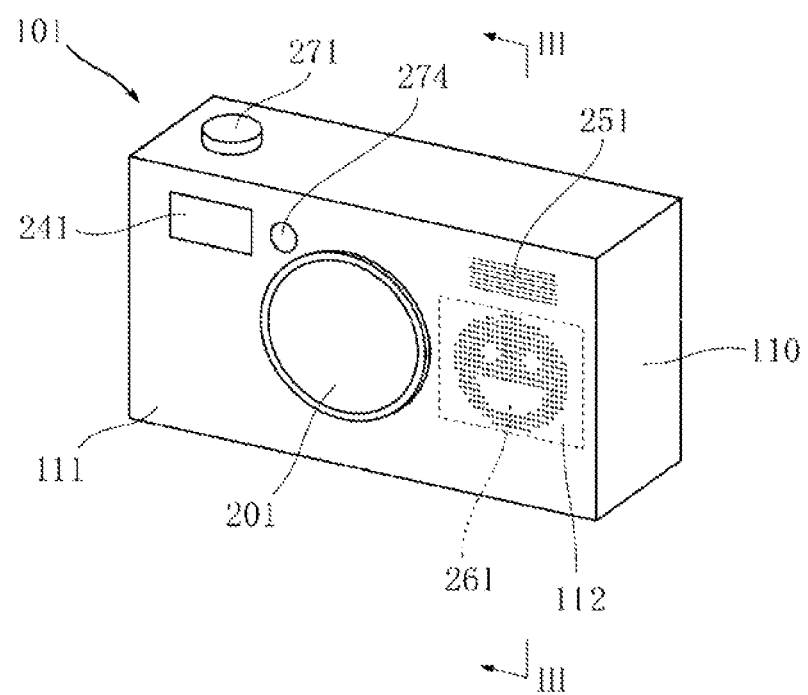
FIG. 1 is a perspective view showing a digital camera according to an embodiment of the present disclosure.
Figure 2:
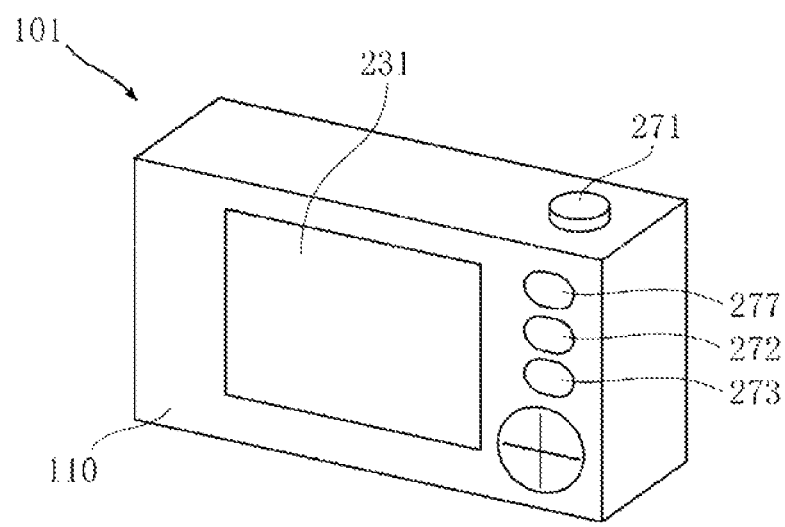
FIG. 2 is another perspective view showing the digital camera of FIG. 1.
Figure 4:
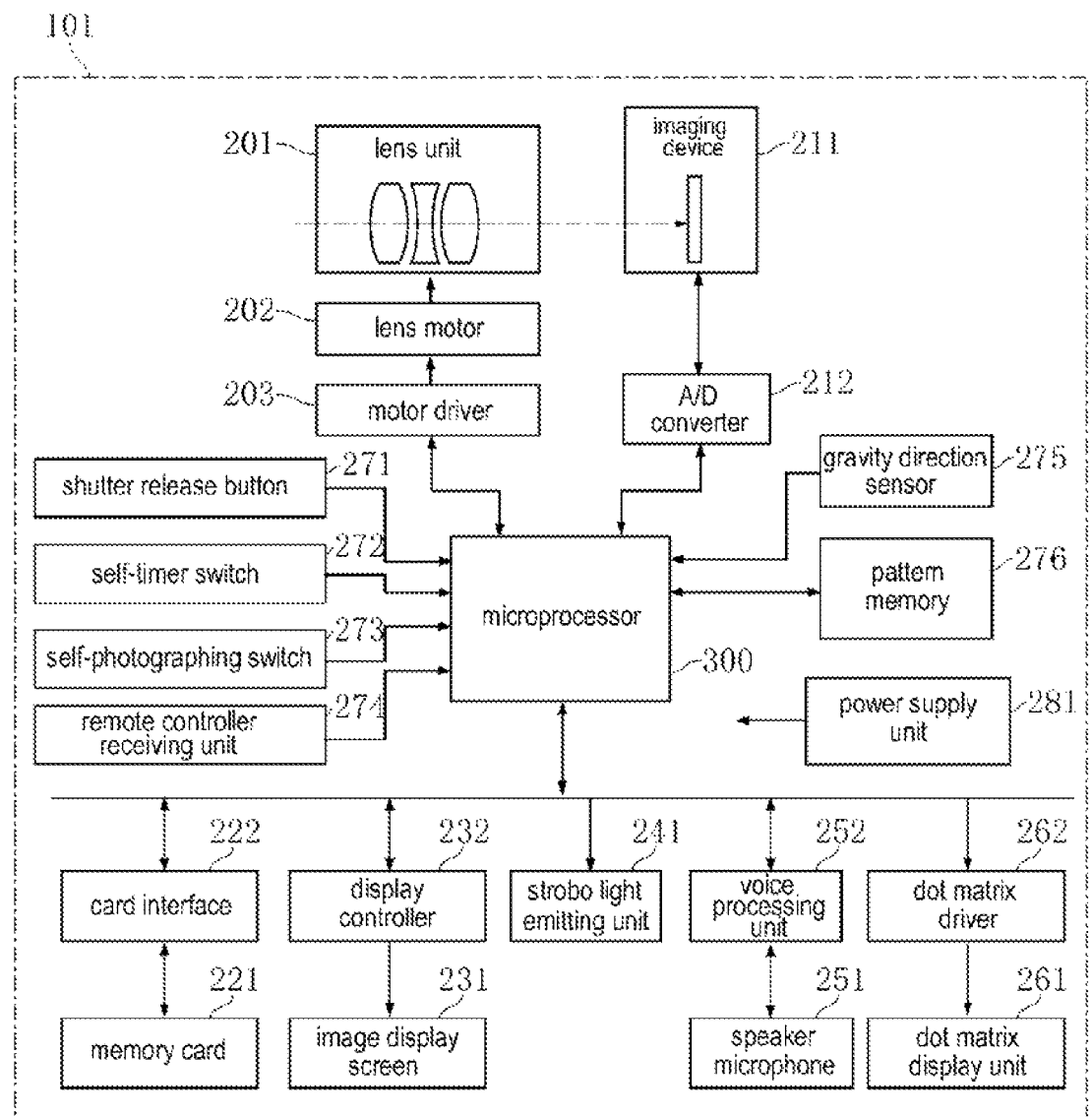
FIG. 4 shows a system configuration of the digital camera of FIG. 1.

FIGS. 1, 2 and 4 show one example of a digital camera according to an embodiment of the present disclosure. In this embodiment, a digital camera 101 includes a case 110, a lens unit 201, a lens motor 202, a motor driver 203, an imaging device 211, an analog-digital (A/D) converter 212, a microprocessor 300, a card interface 222, an image display screen 231, a display controller 232, a strobo light emitting unit 241, a speaker microphone 251, a voice processing unit 252, a dot matrix display unit 261, a dot matrix driver 262, a shutter release button 271, a self-timer switch 272, a self-photographing switch 273, a remote controller receiving unit 274, a gravity direction sensor 275, a pattern memory 276, a mode select switch 277 and a power supply unit 281. An example of the gravity direction sensor 275 may include an accelerometer to detect the gravity direction by finding gravity acceleration.

Figure 3:
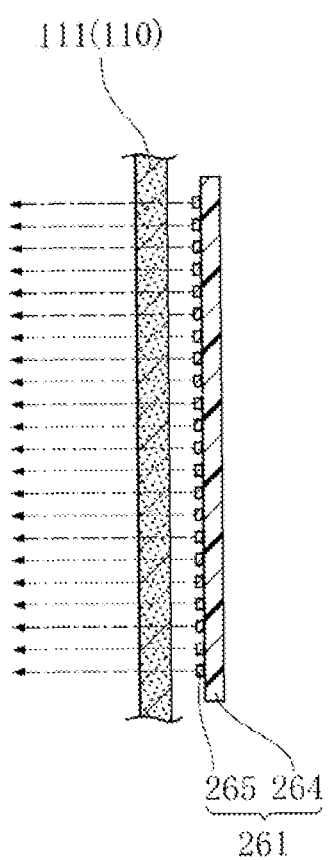
FIG. 3 is a main part sectional view taken along line III-III in FIG. 1.

The case 110 defines an external appearance of the digital camera 101 and is used to accommodate and protect other various components. The case 110 may be made of for example, resin or metal. As shown in FIG. 1, the case 110 includes a front part 111 and a cover plate 112. The front part 111 faces a subject and is provided with the lens unit 201. The cover plate 112 constitutes a portion of the front part 111 and covers the dot matrix display unit 261, as shown in FIGS. 1 and 3. The cover plate 112 may be made of, for example, translucent resin having a color identical or similar to that of the case 110.

The microprocessor 300 controls the entire operation of the digital camera 101. In this embodiment, the microprocessor 300 includes the functions of the display controller, image processor and self-timer device which are described in the specification and defined in the claims.

The lens unit 201 is an optical means, which includes a plurality of lenses for forming an image of a subject on the imaging device 211. The lens motor 202 is a driving source for automatically adjusting focus of the lens unit 201. The motor driver 203 drives and controls the lens motor 202 according to an automatic focus adjustment command from the microprocessor 300. In one embodiment, a focus adjustment unit includes an automatic focus adjustment unit and a manual operating unit. The automatic focus adjustment unit, such as the motor driver 203, automatically adjusts image formation on the imaging device. The manual operating unit, such as the shutter release button 271, triggers the automatic focus adjustment unit. During operation of the manual operating unit, the display controller 232 controls the dot matrix display unit 261 to display a pattern.

The imaging device 211 may be, for example, a CCD (Charge-Coupled Device) and has a photoelectric conversion function to convert an image formed on the lens unit 201 into an electrical signal. The A/D converter 212 converts an analog signal from the imaging device 211 into a digital signal. Image data processed by the A/D converter 212 is stored in a memory card 221 or the like under control of the microprocessor 300, and is used to produce an automatic focus adjustment command based on, for example, variation of the contrast of the image data before the image is recorded. As described above, the motor driver 203 performs the automatic focus adjustment to drive the lens motor 202 such that the contrast of the image data is maximized, according to the focus adjustment command based on the contrast of the image data.

The card interface 222 inputs image data and so on to the memory card 221, which is externally inserted, or outputs image data and so on from the memory card 221. The image display screen 231 may be, for example, a liquid crystal display panel and displays a captured image and information on the digital camera 101. The display controller 232 controls display of the image display screen 231. The strobo light emitting unit 241 is provided in the front part 111, as shown in FIG. 1, and is used to illuminate the subject to be photographed in a dark place. The speaker microphone 251 inputs and outputs voice. The voice processing unit 252 controls the voice input/output of the speaker microphone 251. In addition, although the speaker microphone 251 is actually composed of a speaker and a microphone which are separately arranged adjacent to each other in the position of the speaker microphone 251, this will not cause a problem with howling since the speaker and the microphone are unlikely to be simultaneously used.

The dot matrix display unit 261 includes a board 264 and a plurality of LED modules 265, as shown in FIG. 3. The board 264 has, for example, a rectangular shape and is made of glass epoxy resin, ceramics or the like. Each of the LED modules 265 is composed of an LED chip, a substrate or lead to which the LED chip is bonded, sealing resin covering the LED chip, etc. The sealing resin consists of resin, passing light from the LED chip, and may be mixed with a fluorescent material. The plurality of LED modules 265 is mounted on the board 264 in the form of a matrix. In this embodiment, for example, 880 (22 in length×40 in width) LED modules 265 are mounted on the board 264. Alternatively, a plurality of LED chips only may be mounted on the board 264.

In this embodiment, the aspect ratio of the dot matrix display unit 261 is equal to the aspect ratio of the image captured by the digital camera 101. In this case, the aspect ratio of the dot matrix display unit 261 is also equal to the aspect ratio of the image display screen 231. The area of the dot matrix display unit 261 may be 5% to 50% of the area of the front part 111 excluding the lens unit 201. The dot matrix display unit 261 is arranged inside the cover plate 112. Accordingly, in the dot matrix display unit 261, light from the LED modules 265 is invisible to the naked eye during an OFF period while being visible to the naked eye during an ON period.

The area of the dot matrix display unit 261 is generally concluded as a practical area based on a design simulation which will be described later. As apparent from FIGS. 15 to 28 showing the design simulation, an area of the self-timer lamp 904 is about 1% or so of the area of the front part of the case 901 excluding the lens unit 902. In contrast, the area of the dot matrix display unit 261 is noticeably large. Regarding a lower limit, in consideration of common use, if the ratio of the area of the dot matrix display unit 261 to the area of the front part 111 excluding the lens unit 201 is 5% or so, the power of discrimination for pattern changes is deteriorated, although it also depends on a distance from the digital camera 101 and the design of the display patterns. In addition, during self-photographing, since a distance from the digital camera 101 is small, a horizontal indicator of a position of facial contour can be discriminated for even an area ratio of 3%. On the other hand, regarding an upper limit, although a layout where the area ratio of the dot matrix display unit 261 exceeds 50% or so may be possible in design, this layout may provide excessive functionality and thus also become unbalanced in terms of the arrangement of various components of the digital camera 101.

The dot matrix driver 262 controls ON/OFF states of the dot matrix display unit 261 based on a command from the microprocessor 300.

The shutter release button 271 is used by a user for a photographing operation. The self-timer switch 272 is a switch to set the digital camera 101 to a self-timer mode. The self-photographing switch 273 is a switch to set the digital camera 101 to a self-photographing mode. The remote controller receiving unit 274 receives a signal from a remote controller transmitting unit separated from the digital camera. Upon receiving a remote controller signal from the remote controller transmitting unit operated by an operator distanced from the camera, the microprocessor 300 performs a shutter release after the lapse of a predetermined time (for example, 2 seconds) from the reception of the signal. During the predetermined time from the reception of the signal, the operator of the remote controller can prepare for photographing by taking a pose, such as lowering his/her arm, after operating the remote controller. This procedure is similar to that of the self-timer function.

The gravity direction sensor 275 detects and outputs the gravity direction. The pattern memory 276 stores a plurality of patterns to be displayed on the dot matrix display unit 261. These patterns are, for example, a plurality of standard patterns including a standard pattern 401 shown in FIG. 6 or a plurality of portrait patterns including portrait patterns 405 and 406 shown in FIGS. 9 and 10. The mode select switch 277 is used for switching between a photographing mode and reproduction mode, portrait registration and voice sampling mode selection. A buffer memory 278 is used to temporarily store a captured image. The power supply unit 281 supplies power from an external power source or a battery to various components.

Figure 5:
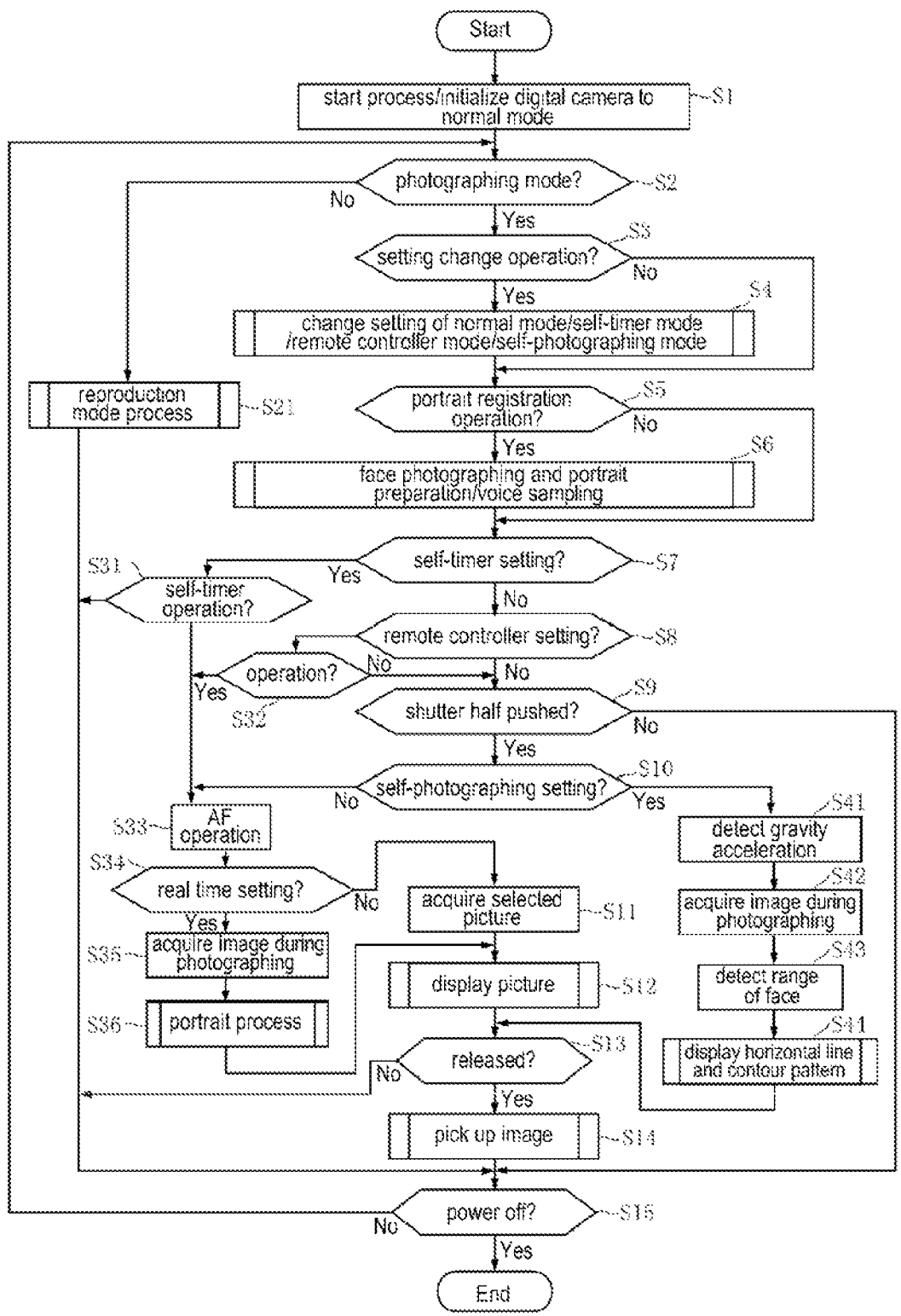
FIG. 5 is a flow chart showing an operation of the digital camera of FIG. 1.

Next, operation of the digital camera 101 will be described with reference to FIG. 5. FIG. 5 shows a control flow of the microprocessor 300.

In Step S1, when power is turned ON, a process starts and the digital camera is initialized to a normal mode. Subsequently, in Step S2, it is determined whether the digital camera is in a photographing mode or a reproduction mode. If it is determined that the digital camera is in the reproduction mode, the reproduction mode process is performed in Step S21. In the reproduction mode process, an image stored in the memory card 221 is displayed in the image display screen 231. When the reproduction mode process is terminated, the flow proceeds to Step S15.

On the other hand, if it is determined in Step S2 that the digital camera is in the photographing mode, the flow proceeds to Step S3 where it is determined whether or not a setting change operation by the mode select switch 277 is present. If it is determined in Step S3 that the setting change operation is present, the flow proceeds to Step S4 where a setting change operation for various modes is performed, and then proceeds to Step S5. More specifically, in Step S4, setting change is performed according to the operation among a normal mode, a self-timer mode, a remote controller mode or a self-photographing mode. On the other hand, if it is determined in Step S3 that the setting change operation is not present, the flow proceeds to Step S5 directly. In Step S5, it is determined whether or not a portrait registration operation is performed. If it is determined that the portrait registration operation is performed, the flow proceeds to Step S6.

In Step S6, an image process is first performed for an image captured by the imaging device 211 according to an image processing function included in the microprocessor 300. An example of this image process may include extraction of shapes of the facial contour, eyes, nose, mouth, head, etc. of a person. This image process generates the portrait patterns 405 and 406 which are then stored, as portrait patterns of a particular person being the subject, in the pattern memory 276. Alternatively, a plurality of portrait patterns including the portrait patterns 405 and 406 may be stored beforehand in the pattern memory 276. Further, a portrait pattern most similar or relevant to the particular person may be selected through comparison of the stored portrait patterns with the results of the image process and then registered as a portrait of the particular person. In Step S6, voice input from the speaker microphone 251 may be sampled and registered as the voice of the particular person. Thus, the portrait pattern and the voice corresponding to the particular person are stored in the pattern memory 276. If it is determined in Step S5 that the portrait registration operation is not performed, the flow proceeds to Step S7 directly without going through Step S6.

In Step S7, it is determined whether or not the current setting is the self-timer mode. If it is determined that the current setting is the self-timer mode, the flow proceeds to Step S31 where it is determined whether or not a self-timer is in operation. If it is detected that the shutter release button 271 as a manual operating unit is pushed in the self-timer mode, the self-timer starts, although this detection is not shown in FIG. 5. In Step S31, it is determined whether or not the self-timer is in operation through such start of the self-timer. If it is determined in Step S31 that the self-timer is in operation, the flow proceeds to Step S33 where an auto-focusing (AF) operation is performed by the motor driver 203 and the lens motor 202. In this step, if it is determined that the AF operation has already been performed and is currently being performed, then this AF operation continues to be performed. Next, in Step S34, it is determined whether or not the current setting is the real time setting.

Figure 6A:
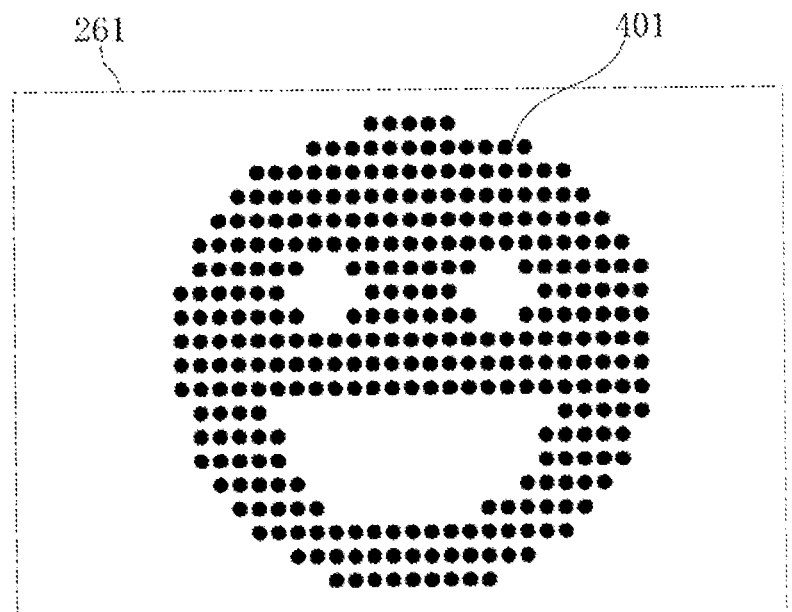
FIGS. 6A and 6B are a front view showing a dot matrix display unit on which one example of a standard pattern is displayed, and a front view showing the dot matrix display unit on which another example of a standard pattern is displayed.
Figure 6B:
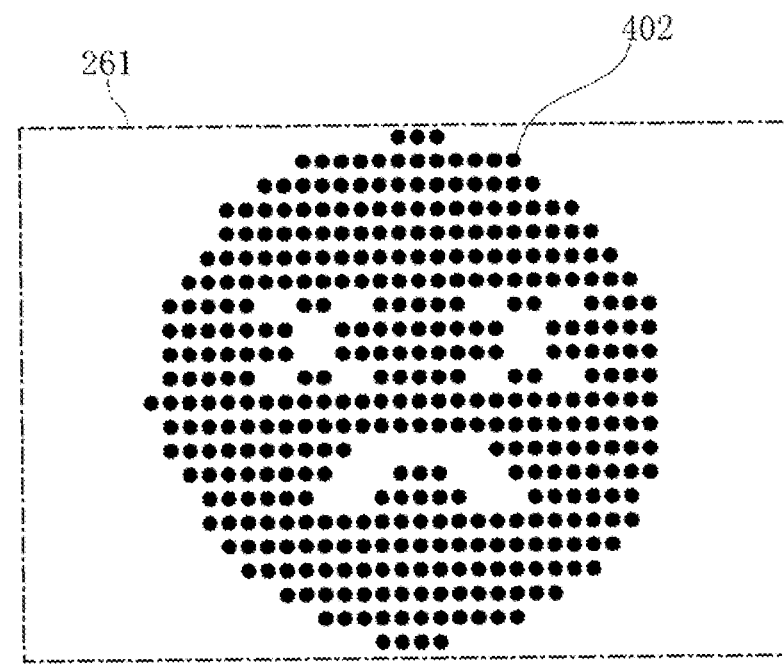

If it is determined in Step S34 that the current setting is not the real time setting, the flow proceeds to Step S11 where one of a plurality of pictures selected beforehand for display is acquired. For example, one of a plurality of standard patterns stored in the pattern memory 276, such as, for example, the pre-selected standard patterns shown in FIG. 6A or 6B, is acquired. Next, in Step S12, the acquired picture is displayed on the dot matrix display unit 261. As a result, the standard pattern 401 appears on the front part 111 of the digital camera 101, as shown in FIG. 1.

In addition, as will be described later, Step S11 and Step S12 are repeated in a relatively short time by repetition of a flow loop until shutter release is performed during self-operation. Further, whenever the flow reaches Step S11, each of the different pictures selected forms one scene of a simple moving picture (for example a flip book) implemented by the repetition of the flow loop. Thus, change of the display during the self-timer operation is achieved. In addition, the brightness of dots representing a picture corresponding to this scene may be displayed to have a gradation. On the other hand, one of the standard patterns shown in FIGS. 7 and 8 pre-selected as the standard pattern 401 may be acquired. In addition, in Step S12, if a sound or voice sampled in association with the selected picture beforehand corresponds to the selected picture, a process to instruct the output of sound from the speaker microphone 251 is performed on unit data, which corresponds to one fragment of the sound or voice associated with the selected picture.

After this process, the flow proceeds to Step S13 where it is determined whether or not the shutter release is performed. The shutter release detected in Step S13 is generated by a full press of the shutter release button in the normal mode and the self-photographing mode, the expiration of the self-timer in the self-timer mode, or the expiration of delay time from the remote controller operation in the remote controller mode. If it is determined in Step S13 that the shutter release is performed, the flow proceeds to Step S14 where an image capture process is performed. According to this image capture process, image data can be obtained from the imaging device 211 through the A/D converter 212. The image data is stored in, for example, the memory card 221.

Figure 11:
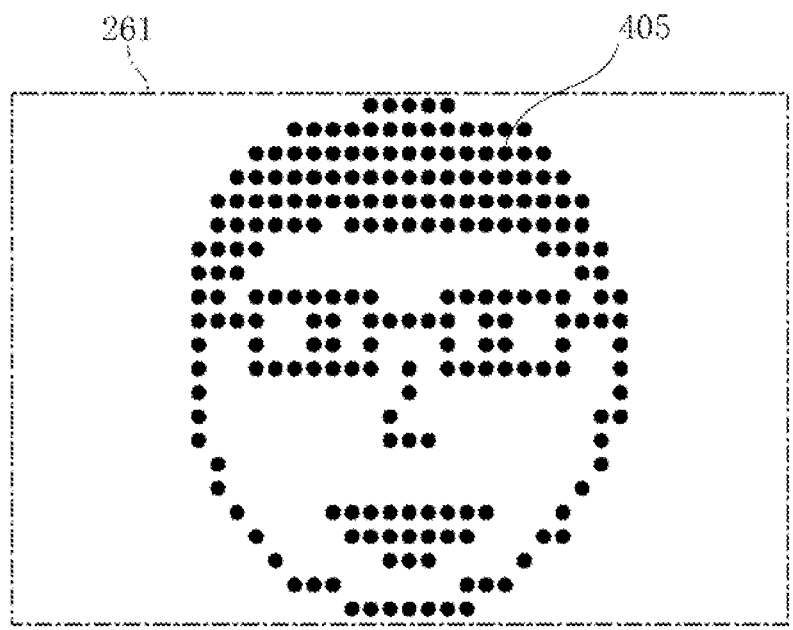
FIG. 11 is a front view showing the dot matrix display unit on which one example of a portrait pattern is displayed.
Figure 12:
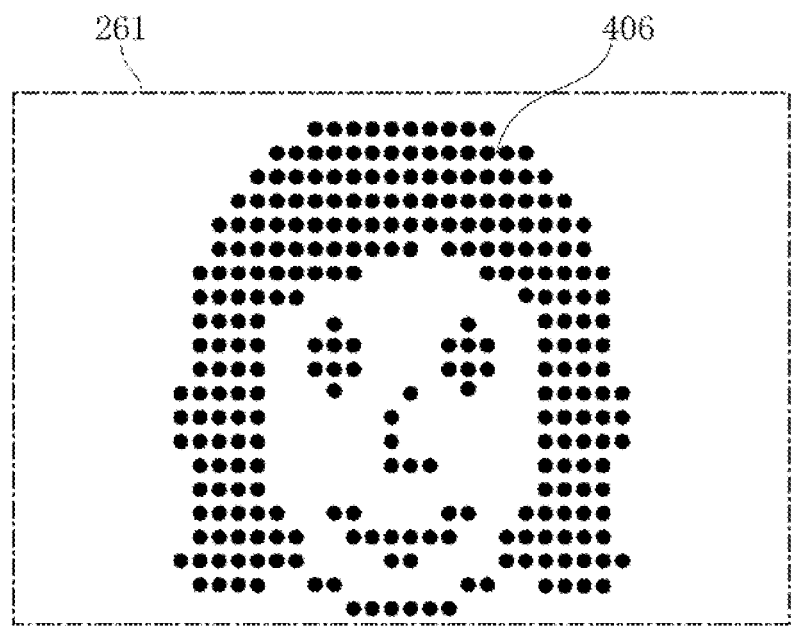
FIG. 12 is a front view showing the dot matrix display unit on which another example of a portrait pattern is displayed.

In addition, if a plurality of portraits having different facial expressions of the same person in the portrait patterns stored in the pattern memory 276 is selected in Step S6, one group from the plurality of portraits may be chosen in Step S11 and be displayed in Step S12. For example, if the subject is a child, one group of portrait patterns 405 resembling his farther, shown in FIG. 11, or one group of portrait patterns 406 resembling his mother, shown in FIG. 12, is selected and displayed. In addition, in Step S12, while displaying a portrait pattern 405 or portrait pattern 406, the corresponding unit data of voice stored in the pattern memory 276 is output from the speaker microphone 251.

On the other hand, if it is determined in Step S34 that the current setting is the real time setting, an image during photographing is acquired in Step S35. Then, in Step S36, a portrait process is performed for the acquired image in real time. More specifically, extraction of the shapes of the facial contour, eyes, nose, mouth, etc. of a person is performed according to the image processing function of the microprocessor 300, and a similar portrait pattern is selected from the plurality of portrait patterns stored in the pattern memory 276. For example, if the subject is an adult male, the portrait pattern 405 shown in FIG. 11 is selected. If the subject is an adult female, the portrait pattern 406 shown in FIG. 12 is selected. Then, the flow proceeds to Step S12 where these real time portrait patterns 405 and 406 produced from the image acquired during photographing are displayed on the dot matrix display unit 261.

Returning to Step S7, if it is determined that the current setting is not the self-timer mode, the flow proceeds to Step S8 where it is determined whether or not a remote controller setting is performed. If it is determined that the remote controller setting is performed, the flow proceeds to Step S32 where it is determined whether or not a transmission from the remote controller transmitting unit is received in the remote controller receiving unit 274. If it is determined that a transmission is received, the flow proceeds to Step S33 where a simple moving picture (for example, a flip book) continues to be displayed until the delay time elapses in such a manner as done in the self-timer mode. Thus, the change of display during the delay time of the remote controller is achieved. On the other hand, if it is determined in Step S8 that the remote controller setting is not performed or if it is determined in Step S32 that the transmission is not received, the flow proceeds to Step S9.

In Step S9, it is determined whether or not the shutter release button 271 is half pushed. If it is determined that the shutter release button is half pushed, the flow proceeds to Step S10 where it is determined whether or not the self-photographing mode is set. If it is determined that the self-photographing mode is not set, that is, if the normal mode is set, the flow proceeds to Step S33 where a simple moving picture (for example, a flip book) continues to be displayed until the shutter release button is fully pushed to perform the shutter release in such a manner as performed in the self-timer mode. Thus, the change of display during the half pushing of the shutter release button is achieved. In addition, as shown in Step S33, the change of display in the normal mode, the self-timer mode and the remote controller mode is performed in the AF operation prior to photographing. During AF operation, attracting a person's attention and making him show pleasant expression help to obtain an attractive image in subsequent photographing.

On the other hand, if it is determined that the self-photographing mode is set in Step S10, the flow proceeds to Step S41 where gravity acceleration is detected. This step corresponds to the step of detecting the position of the digital camera 101 relative to the gravity direction by means of the gravity direction sensor 275. Next, in Step S42, an image during photographing is acquired, and, in Step S43, a position and area of a face occupied in the image is detected in real time according to the image processing function of the microprocessor 300.

Figure 13:
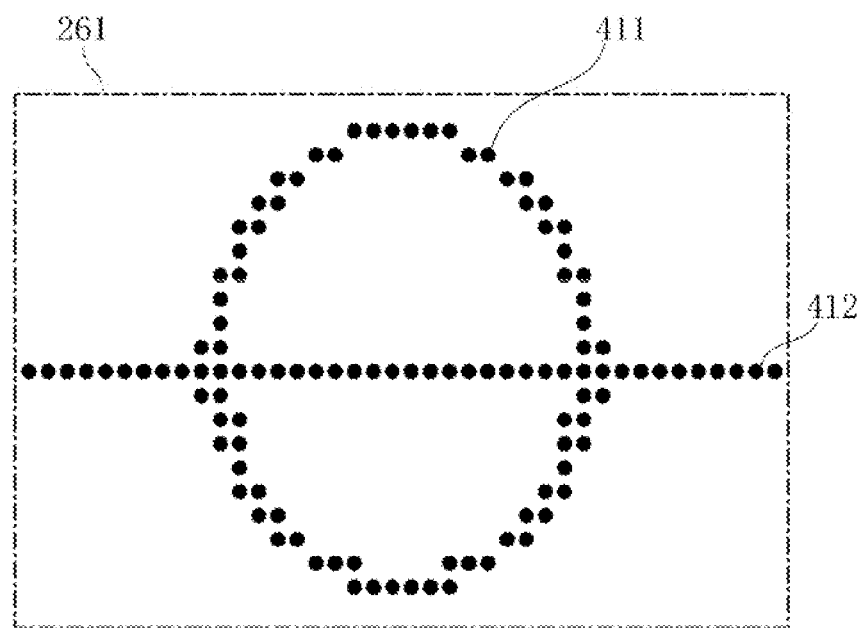
FIG. 13 is a front view showing the dot matrix display unit in a self-photographing mode.
Figure 14:
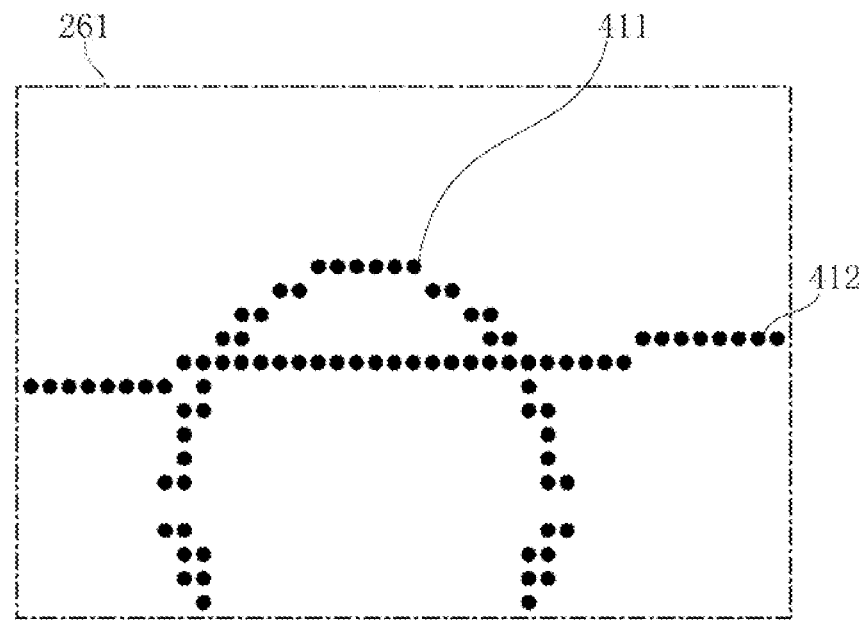
FIG. 14 is a front view showing the dot matrix display unit in a self-photographing mode.
Figure 15:
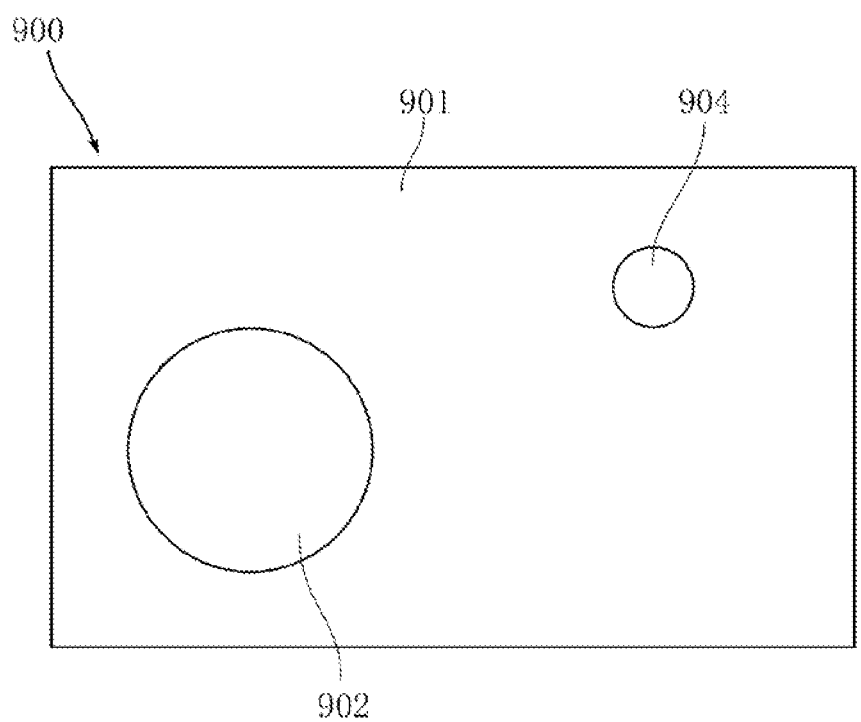
FIG. 15 is a front view used for review of a self-timer lamp size in one example of a conventional digital camera.
Figure 16:
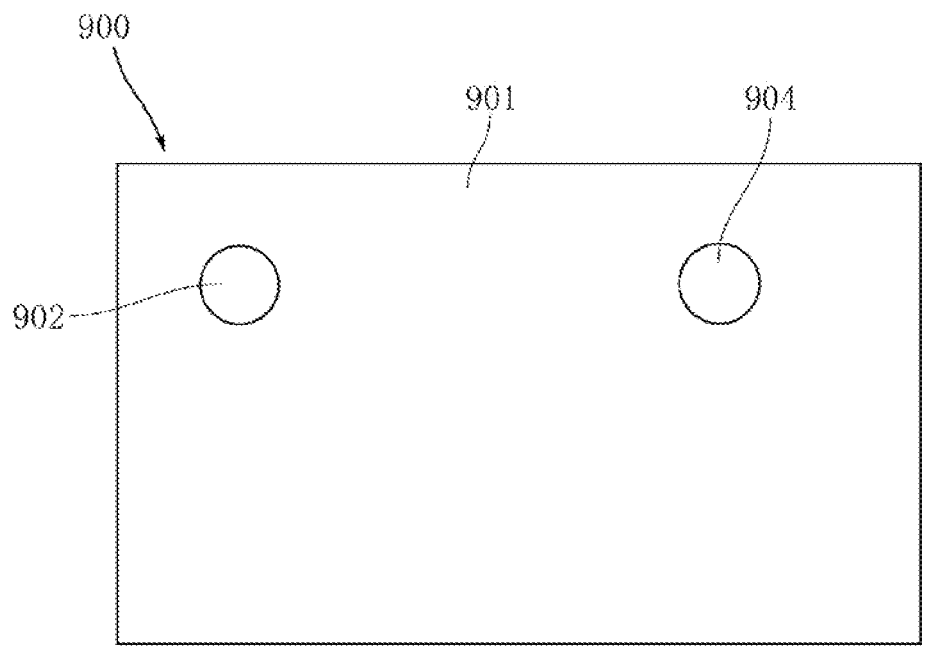
FIG. 16 is a front view used for review of a self-timer lamp size in one example of a conventional digital camera.
Figure 17:
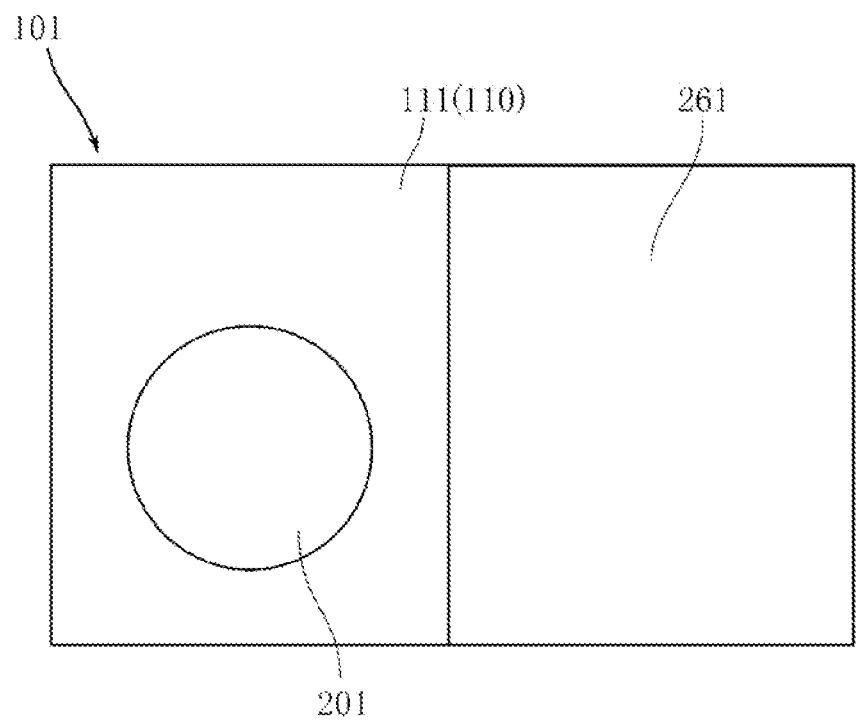
FIG. 17 is a front view used for review of a dot matrix display unit size in one example of the digital camera according to an embodiment of the present disclosure.
Figure 18:
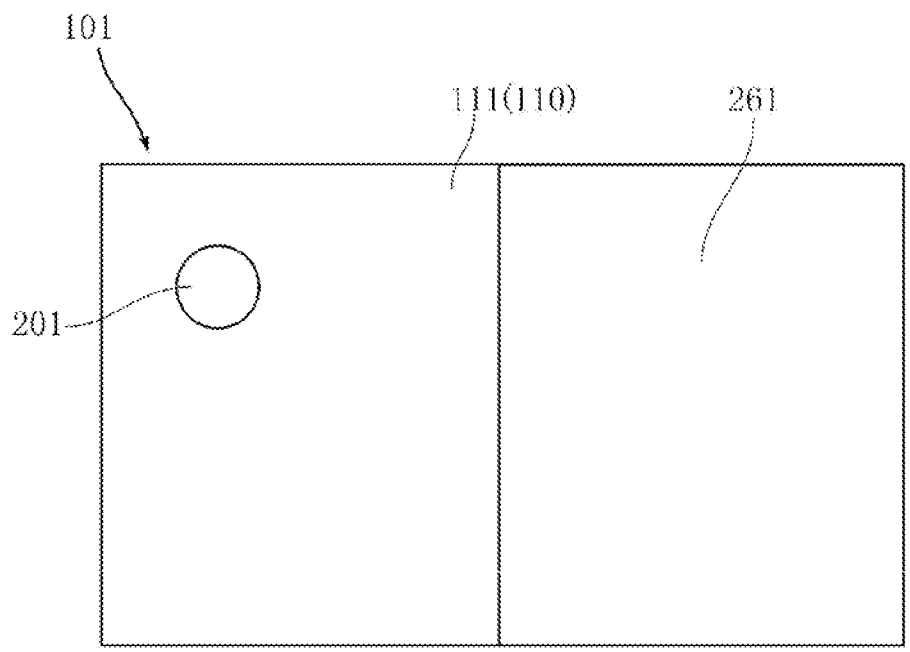
FIG. 18 is a front view used for review of the dot matrix display unit size in one example of the digital camera according to an embodiment of the present disclosure.
Figure 19:
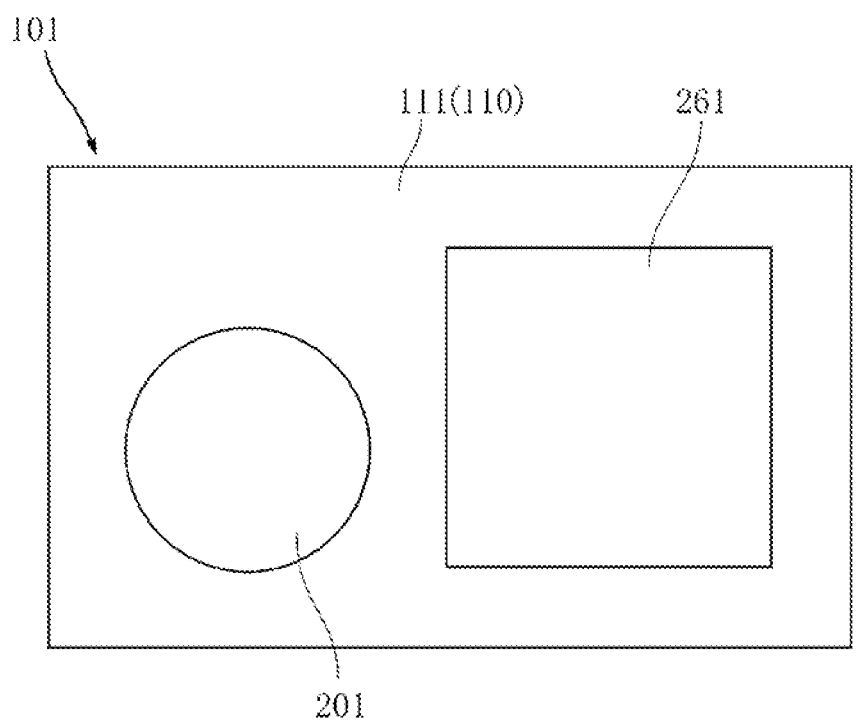
FIG. 19 is a front view used for review of the dot matrix display unit size in one example of the digital camera according to an embodiment of the present disclosure.
Figure 20:
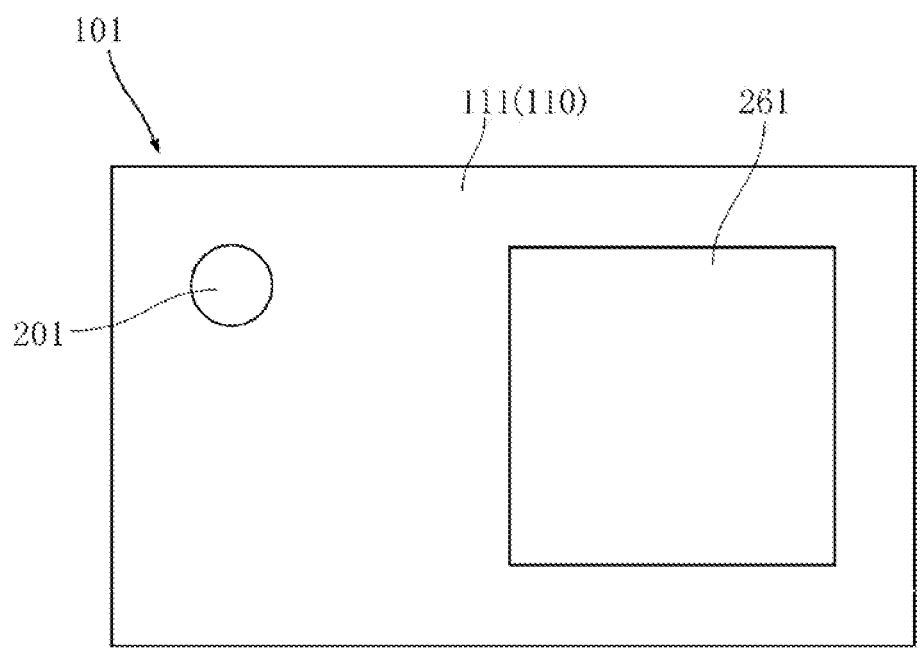
FIG. 20 is a front view used for review of the dot matrix display unit size in one example of the digital camera according to an embodiment of the present disclosure.
Figure 21:
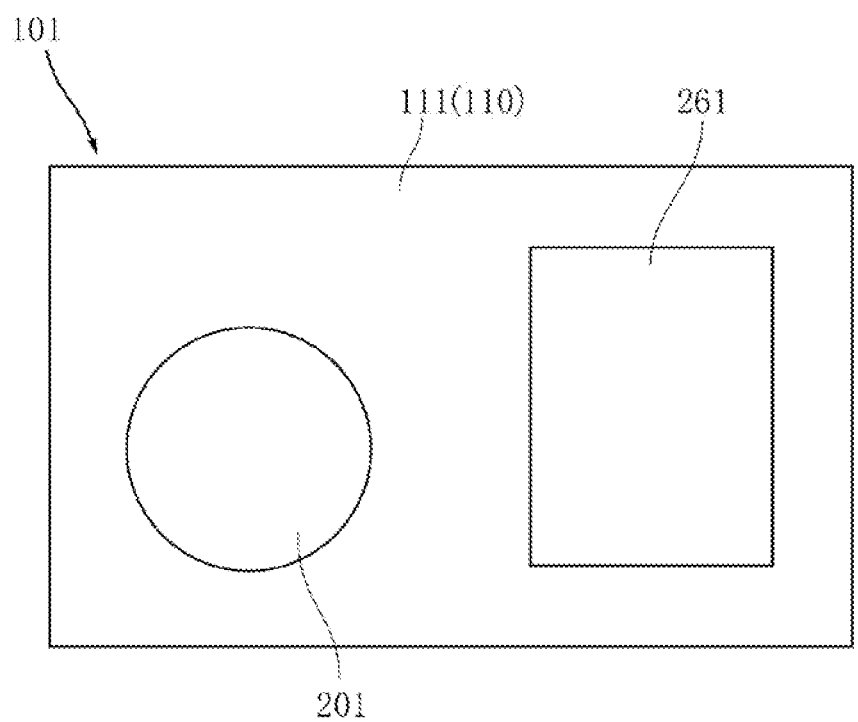
FIG. 21 is a front view used for review of the dot matrix display unit size in one example of the digital camera according to an embodiment of the present disclosure.
Figure 22:
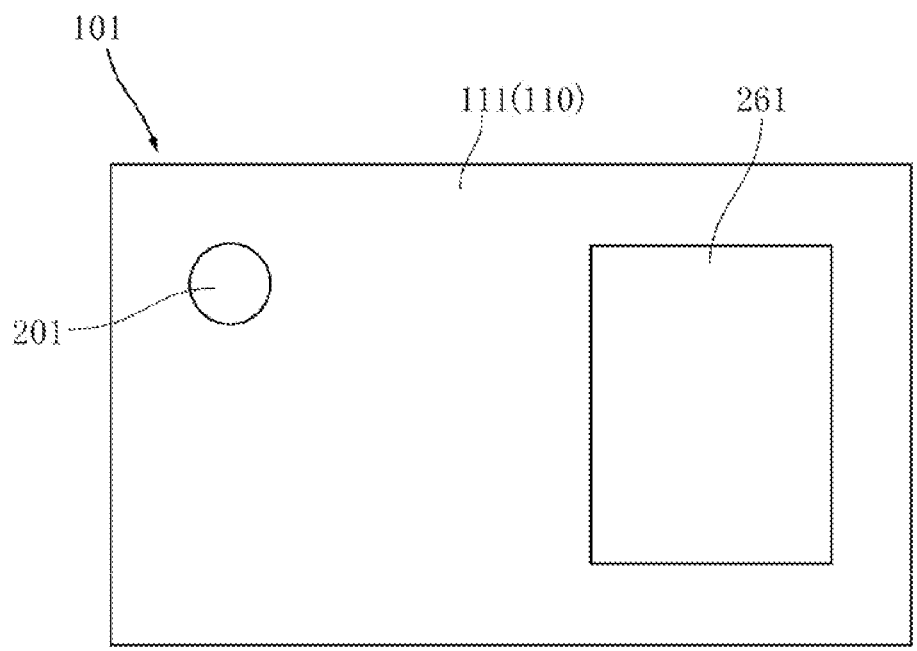
FIG. 22 is a front view used for review of the dot matrix display unit size in one example of the digital camera according to an embodiment of the present disclosure.
Figure 23:
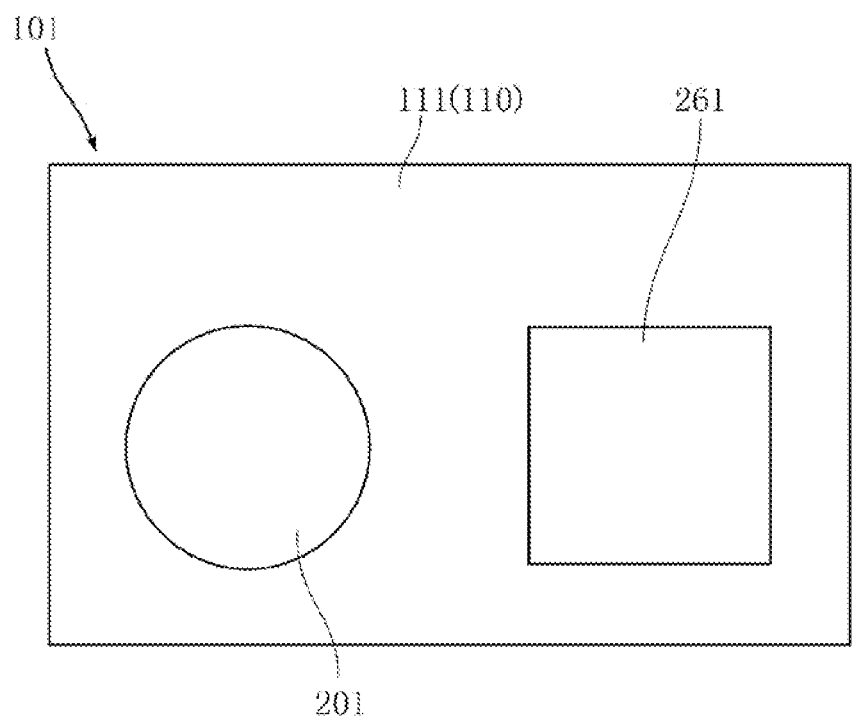
FIG. 23 is a front view used for review of the dot matrix display unit size in one example of the digital camera according to an embodiment of the present disclosure.
Figure 24:
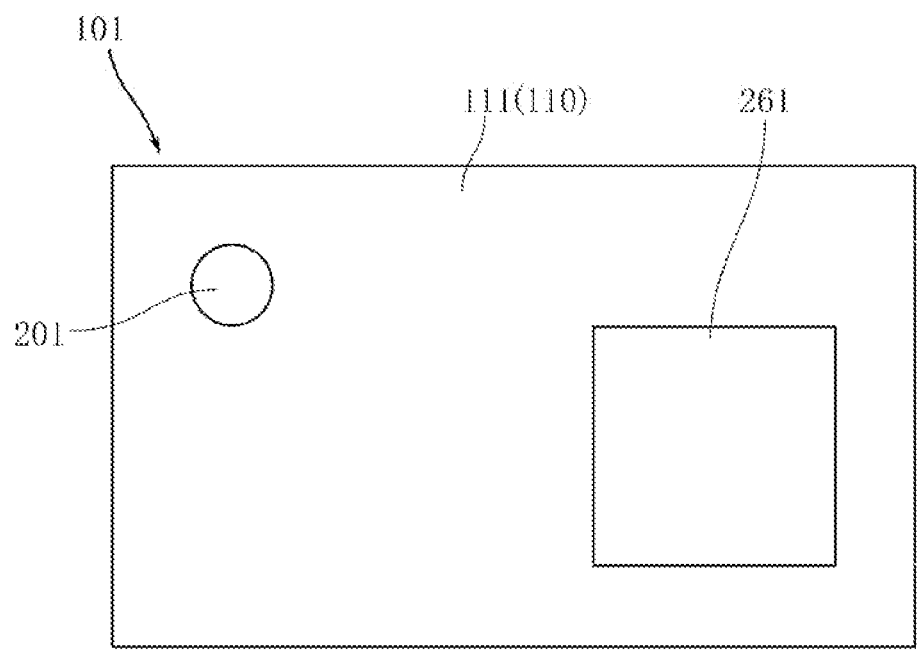
FIG. 24 is a front view used for review of the dot matrix display unit size in one example of the digital camera according to an embodiment of the present disclosure.
Figure 25:
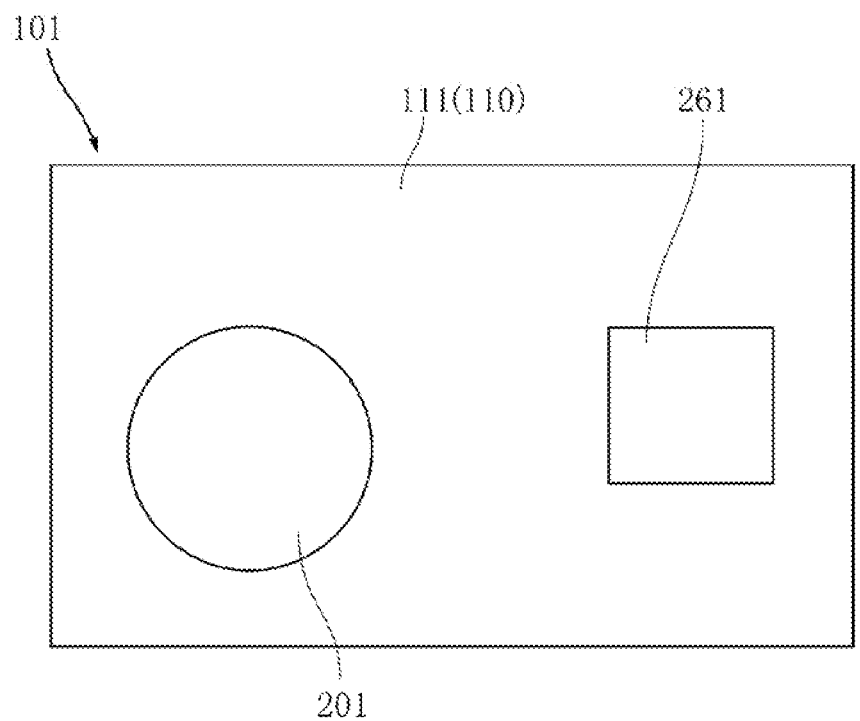
FIG. 25 is a front view used for review of the dot matrix display unit size in one example of the digital camera according to an embodiment of the present disclosure.
Figure 26:
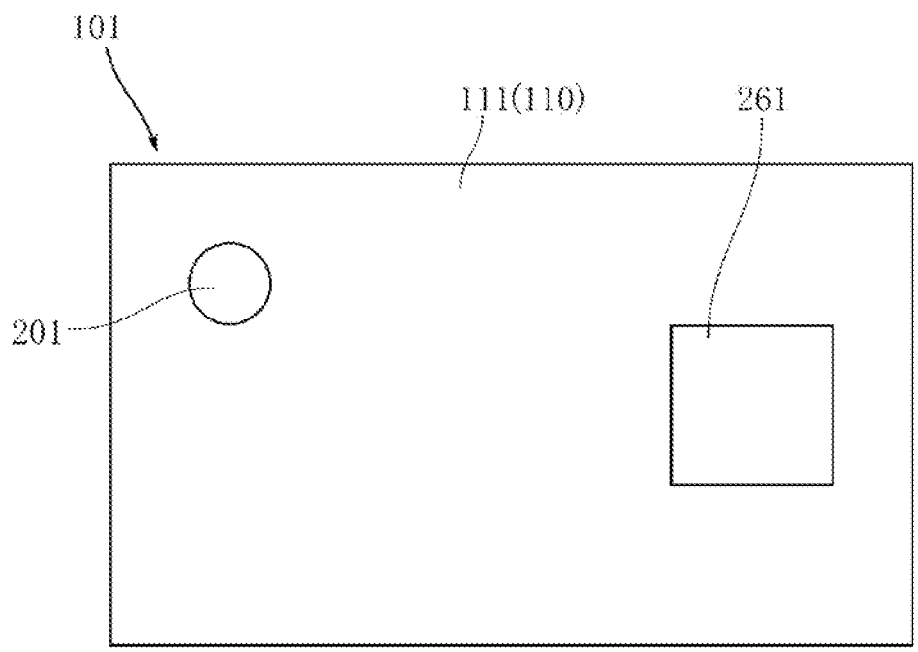
FIG. 26 is a front view used for review of the dot matrix display unit size in one example of the digital camera according to an embodiment of the present disclosure.
Figure 27:
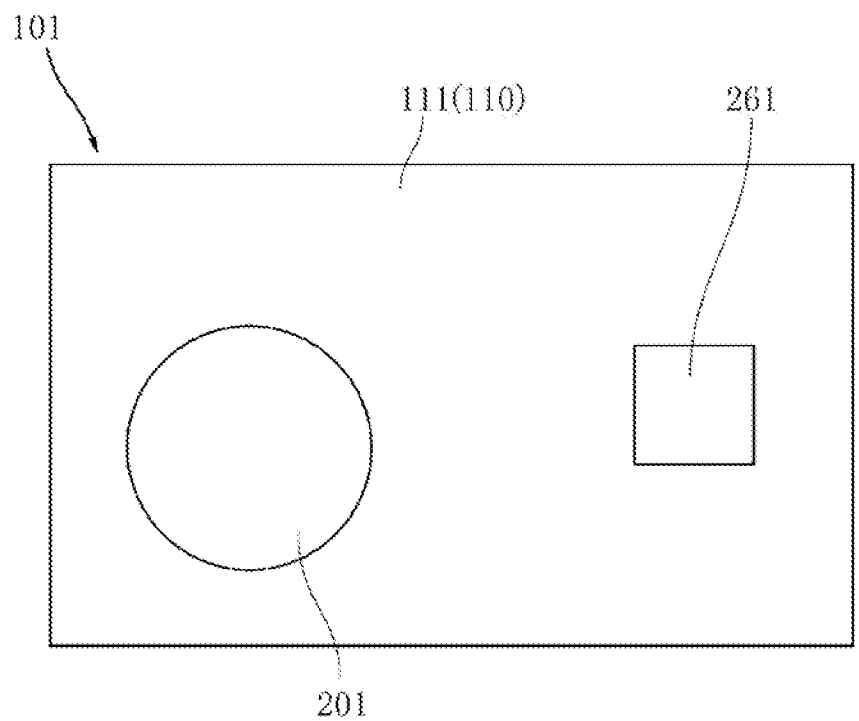
FIG. 27 is a front view used for review of the dot matrix display unit size in one example of the digital camera according to an embodiment of the present disclosure.
Figure 28:
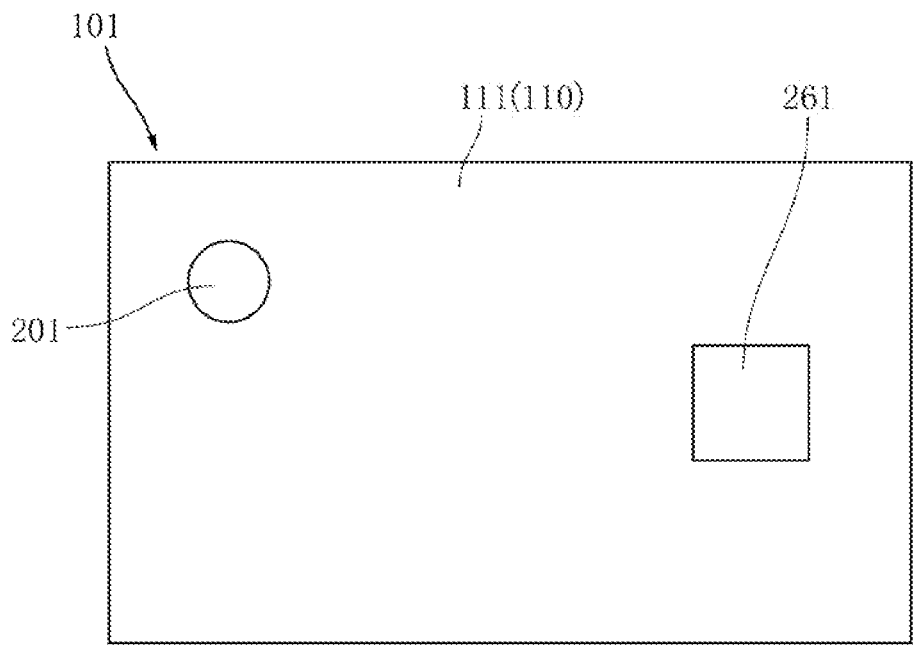
FIG. 28 is a front view used for review of the dot matrix display unit size in one example of the digital camera according to an embodiment of the present disclosure.
Figure 29:
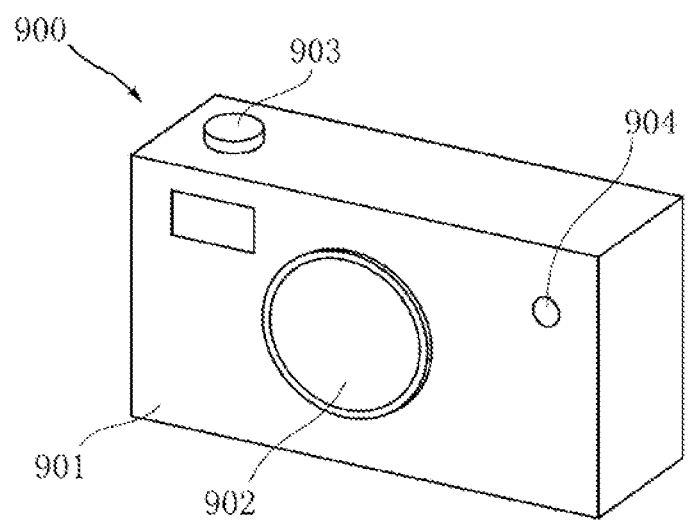
FIG. 29 is a perspective view showing one example of a conventional digital camera.

Next, in Step S44, a contour pattern 411 and a horizontal line 412 are displayed on the dot matrix display unit 261 in real time, as shown in FIG. 13. The contour pattern 411 is, for example, simply elliptical and its area and position coincides with the area and position of the face of the subject in the photographed image, which is obtained in Step S43. The horizontal line 412 represents the horizontal direction detected in Step S41. FIG. 13 shows a state where the digital camera 101 is substantially horizontally placed and the face of the subject occupies almost all of the central area of an image. FIG. 14 shows a state where the digital camera 101 is slightly inclined with respect to the horizontal direction and the face of the subject is deviated from the center of the image with a portion thereof projecting from the image. In the self-photographing mode, the subject is a user who takes a photograph while watching the front part 111 in real time. When the user verifies that the display of the dot matrix display unit 261 is not in the inappropriate condition shown in FIG. 14 but in the appropriate condition shown in FIG. 13, the user fully pushes the shutter release button 271.

If it is determined in Step S13 that the shutter release is performed, the flow proceeds to Step S14 where a photographing process is performed. In addition, a simple moving picture (for example, change in the position of a face contour and a horizontal line by motion of the digital camera) continues to be displayed until the shutter release button 271 is fully pushed to perform the shutter release in such a manner as performed in the self-timer mode. Thus, even in the case of self-photographing, change of display during the half pushing of the shutter release button 271 is achieved and the full pushing of the shutter release button 271 can be deferred until a desired self-photographing state is verified. Further, for the self-photographing, since a distance between the digital camera 101 and the subject is limited to the length of the arm of the user and the lens unit 201 is driven at a position appropriate for close-up macro photographing based on this distance, no AF operation is performed.

The above-mentioned repetition of flow will be now described. The repetition of flow occurs if it is determined in Step S13 that the shutter release is not performed. This case corresponds to a case where the full pushing of the shutter release button 271 is deferred to perform the AF operation or composition matching in the normal mode or composition matching in the self-photographing mode, a case where the self-timer is in operation in the self-timer mode, or a state during the delay time of the remote controller operation in the remote controller mode. If it is determined in Step S13 that the shutter release is not performed, the flow proceeds to Step S15 directly without performing the photographing process.

In addition, if it is determined in Step S31 that the self-timer is not in operation, which means that the shutter release has already been performed by the self-timer, the flow proceeds to Step S15. In addition, if it is determined in Step S9 that the shutter release button 271 is not half pushed, which means that no operation for photographing in the normal mode is performed, the flow proceeds to Step S15. In Step S15, it is determined whether or not power is turned off. If it is determined that power is not turned off, the flow returns to Step S2. As long as it is determined in Step S15 that power is not turned off, Steps S2 to S44 in FIG. 5 are repeated.

With this configuration, for example, for a case where the shutter release button 271 is half pushed in the normal mode having no real time setting, a function by the repetition of flow of FIG. 5 is pursued. Since the digital camera is in the photographing mode, the flow proceeds from Step S2 to Step S3. If the setting change operation and portrait registration operation are not performed, the flow proceeds to Step S7. Since the current mode is the normal mode, the flow further proceeds to Step S9. Since the current setting is not the self-photographing mode in the condition of half pushing, the flow proceeds to Step S33. Since the current setting is not the real time setting, the flow proceeds to Step S11 where one of a plurality of selected pictures is selected according to a predetermined order.

In FIGS. 6A and 6B, for example, if the pattern shown in FIG. 6A has already been selected and displayed, the pattern shown in FIG. 6B is also selected and displayed in Step S12. Thus, as long as the half pushing of the shutter release button 271 continues, Steps S33, S11 and S12 are substantially repeated, and, on each occasion, the smiling face of FIG. 6A and tearful face of FIG. 6B are alternately displayed, arousing the attention, relaxing the facial expression and inducing a smiling face of the subject who is watching the patterns.

Effects of the repetition of flow and the simple moving picture in the real time setting including the self-timer mode, the remote controller mode, the self-photographing mode and the normal mode can be understood if the flow is pursued in the same manner, and, therefore, explanation of which will not be repeated. In addition, if a greater number of pictures selected and acquired in Step S11 are set, a smoother moving picture can be achieved and the display of a moving picture modified by, for example, smoothly connecting the patterns of FIGS. 6A and 6B can be also achieved. Meanwhile, if it is determined in Step S15 that the power is turned off, the operation of the digital camera 101 is ended.

Next, actions and effects of the digital camera 101 will be described.

According to this embodiment, in the normal mode, the self-mode and the remote controller mode, the standard pattern shown in FIGS. 6A and 6B first appear as a simple moving picture on the front part 111 of the digital camera 101. A change of the standard pattern 401 is a design resembling a smiling face which is likely to attract a child's interest. This allows children or animals to pay close attention to the photographing digital camera 101 for the purpose of achieving a properly photographed image.

Figure 7:
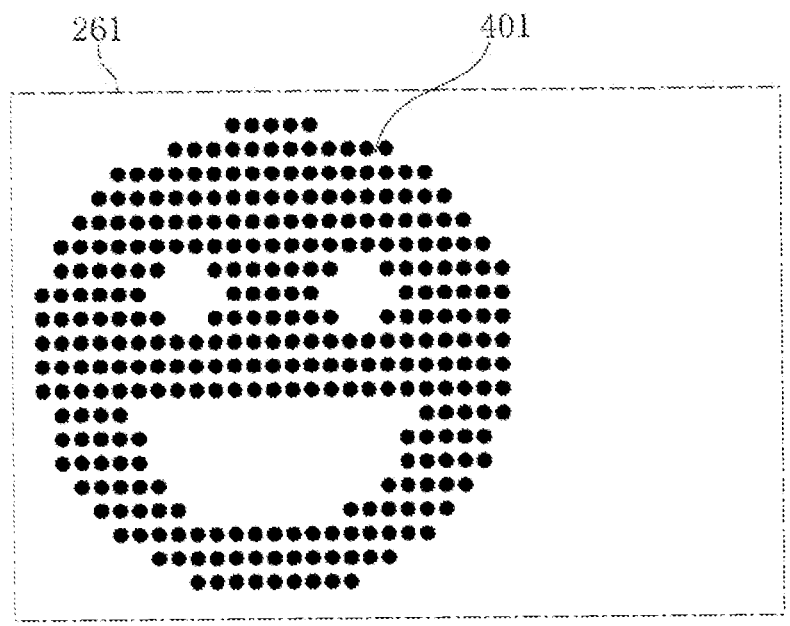
FIG. 7 is a front view showing the dot matrix display unit on which another example of a standard pattern is displayed.
Figure 8:
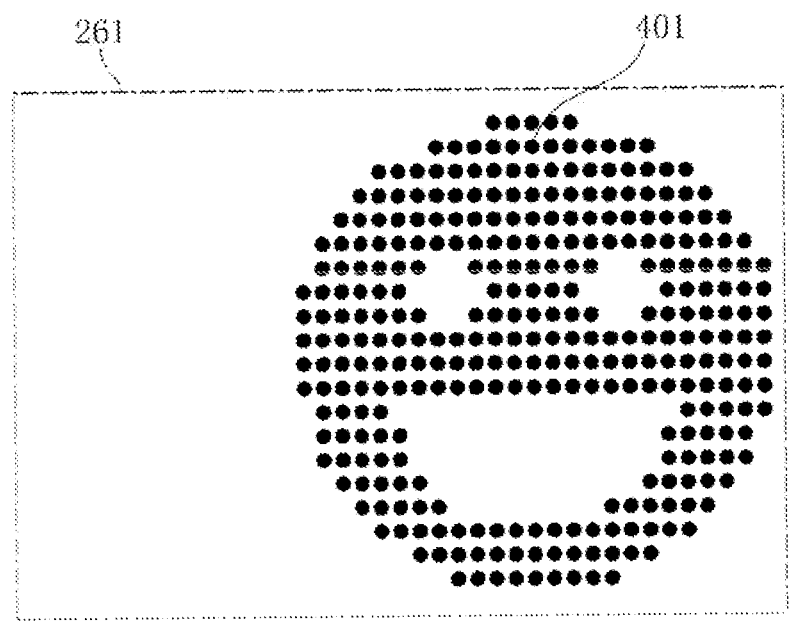
FIG. 8 is a front view showing the dot matrix display unit on which another example of a standard pattern is displayed.
Figure 9:
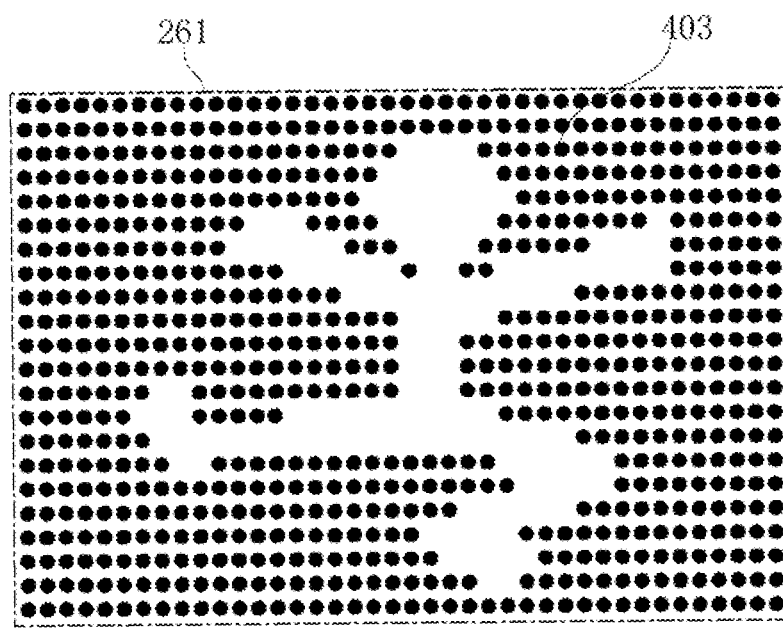
FIG. 9 is a front view showing the dot matrix display unit on which another example of a standard pattern is displayed.
Figure 10:
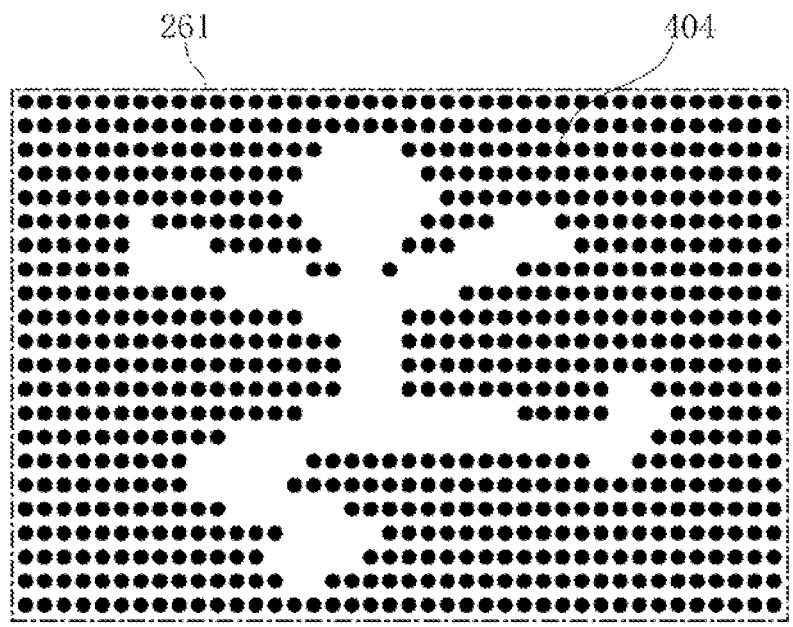
FIG. 10 is a front view showing the dot matrix display unit on which another example of a standard pattern is displayed.

A change of the moving picture may include not only a change of facial expression but also a change of the position of the same design as shown in FIGS. 7 and 8. In addition, as shown in FIGS. 9 and 10, a plurality of images of a dancing person may be prepared, and both images may shift their location according to a comical music or rhythm. Further, a smooth animation may be interpolated and displayed between two images, which is more likely to catch children or animals' attention.

Selecting the pre-stored portrait patterns 405 and 406 can reduce the problems associated with the process as compared to when portraits of individual subjects are produced each time. In addition, the portrait patterns 405 and 406 resembling a child's father or mother are adapted to attract the child's attention. Storing the actual voice of the child's father or mother in association with the portrait patterns 405 and 406 and outputting this voice is optimal to draw the child's attention to the digital camera 101 when the child's father or mother is absent from a photographing site.

By covering the dot matrix display unit 261 with the cover plate 112, the external appearance of the digital camera 101 has no difference from that of a digital camera without the dot matrix display unit 261 when the dot matrix display unit 261 is turned off. On the other hand, when the dot matrix display unit 261 is turned on, a pattern composed of a plurality of dots appears clearly. This is advantageous in providing a smart external appearance of the digital camera 101 and outstanding display of the dot matrix display unit 261.

As the area of the dot matrix display unit 261 is 5% to 50% of the area of the front part excluding the lens unit 201, it is possible to make a pattern displayed on the dot matrix display unit clearly visible to the subject relatively distant from the digital camera 101 and appropriately arrange components used to accomplish the functions of the digital camera 101. FIGS. 15 to 28 show simulations for review. As can be seen from FIGS. 15 and 16, in the conventional digital camera 901, the area ratio of the self-timer lamp 904 to the front part of the case 910 is only about 1% and it is not realistic that the area ratio exceeds 2%. On the other hand, as can be seen from FIGS. 17 and 18, a layout where the area ratio of the dot matrix display unit 261 to the front part 111 in the digital camera 101 exceeds 50% may provide excessive functionality. Next, as can be seen from FIGS. 19 to 28, when the area ratio of the dot matrix display unit 261 to the front part 111 exceeds 5%, a pattern change recognition effect can be expected. In addition, as can be seen from FIGS. 27 and 28, when the area ratio of the dot matrix display unit 261 to the front part 111 is less than 5%, it is not considered that a sufficient pattern change recognition effect can be achieved. In addition, in the self-photographing mode, since a distance between the digital camera 101 and a user (subject) is relatively small, the contour pattern 411 or the horizontal line 412 can be sufficiently verified even when the area ratio of the dot matrix display unit 261 to the front part 111 is 3% or so.

In the self-photographing mode, by verifying the contour pattern 411, a user as a subject can figure out the position and size of his/her face in an image in real time. In addition, by verifying the horizontal line 412, it is possible to prevent the digital camera 101 from taking a photograph with the camera unduly inclined, as shown in FIG. 12. As the aspect ratio of the dot matrix display unit 261 coincides with the aspect ratio of a photographed image, it is possible to make out the photographed state of the image suitably.

When the above-described dot matrix display unit 261 is configured to be mounted on a flexible printed circuit board, this configuration can cope with digital cameras designed such that a front part is curved and can provide a wider range of applications. Thus, the inventive dot matrix display unit mounted on the digital camera is not limited to a flat plane but may be configured to be curved.

According to the present disclosure in some embodiments, a pattern displayed on the dot matrix display unit appears on the front part in taking a photograph. This allows children or animals to pay close attention to the photographing digital camera 101 for the purpose of achieving a properly photographed image effectively. According to the present disclosure in other embodiments, by changing a pattern displayed on the dot matrix display unit in taking a photograph, it is possible to relax the facial expressions of subjects including children and adults, which may result in an attractive image.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An imaging apparatus, comprising:
an imaging device;
a lens provided in a front part and configured to form an image of a subject on the imaging device;
a dot matrix display unit arranged in the front part, the dot matrix display unit including a plurality of LED chips, each of the plurality of LED chips providing a plurality of dots with a light emission state visible by the subject;
a display controller configured to control display of the dot matrix display unit; and
a focus adjustment unit configured to perform an adjustment operation for adjusting image formation on the imaging device,
wherein the dot matrix display unit displays a pattern based on the control of the display controller,
wherein the display controller controls the dot matrix display unit to display a pattern during the adjustment operation of the focusing adjustment unit, and
wherein the focus adjustment unit includes an automatic focus adjustment unit which automatically adjusts the image formation on the imaging device, and a manual operating unit which triggers an operation of the automatic focus adjustment unit, and the display controller controls the dot matrix display unit to display a pattern during operation of the manual operating unit.

2. An imaging apparatus, comprising:
an imaging device;
a lens provided in a front part and configured to form an image of a subject on the imaging device;
a dot matrix display unit arranged in the front part, the dot matrix display unit including a plurality of LED chips, each of the plurality of LED chips providing a plurality of dots with a light emission state visible by the subject;
a display controller configured to control display of the dot matrix display unit;
a manual operating unit; and
a self-timer device which performs a release after a lapse of predetermined timer time after the manual operating unit is operated,
wherein the dot matrix display unit displays a pattern based on the control of the display controller, and
wherein the display controller controls the dot matrix display unit to display a pattern during the predetermined timer time.

3. The imaging apparatus of claim 1, wherein the display controller changes the pattern displayed on the dot matrix display unit during the display of the pattern.

4. An imaging apparatus, comprising:
an imaging device;
a lens provided in a front part and configured to form an image of a subject on the imaging device;
a dot matrix display unit arranged in the front part, the dot matrix display unit including a plurality of LED chips, each of the plurality of LED chips providing a plurality of dots with a light emission state visible by the subject;
a display controller configured to control display of the dot matrix display unit; and
a cover plate which covers the dot matrix display unit, transmits light from the dot matrix display unit, and makes the dot matrix display unit invisible to the external when the dot matrix display unit is turned off,
wherein the dot matrix display unit displays a pattern based on the control of the display controller.

5. The imaging apparatus of claim 1, wherein the dot matrix display unit emits light having a color identical or similar to that of the front part.

6. The imaging apparatus of claim 1, wherein an area of the dot matrix display unit is 5% to 50% of an area of the front part excluding the lens.

7. The imaging apparatus of claim 1, wherein the display controller generates a gradation in the plurality of dots of the dot matrix display unit.

8. The imaging apparatus of claim 1, wherein the display controller changes brightness of the plurality of dots of the dot matrix display unit continuously in time.

9. An imaging apparatus, comprising:
an imaging device;
a lens provided in a front part and configured to form an image of a subject on the imaging device;
a dot matrix display unit arranged in the front part, the dot matrix display unit including a plurality of LED chips, each of the plurality of LED chips providing a plurality of dots with a light emission state visible by the subject;
a display controller configured to control display of the dot matrix display unit; and
a voice output unit,
wherein the dot matrix display unit displays a pattern based on the control of the display controller, and
wherein the display controller changes a display pattern of the dot matrix display unit in association with a change of voice output from the voice output unit.

10. The imaging apparatus of claim 1, further comprising a storage unit which stores an image generated by the imaging device,
wherein the display controller controls the display of the dot matrix display unit based on the image stored in the storage unit.

11. An imaging apparatus, comprising:
an imaging device;
a lens provided in a front part and configured to form an image of a subject on the imaging device,
a dot matrix display unit arranged in the front part, the dot matrix display unit including a plurality of LED chips, each of the plurality of LED chips providing a plurality of dots with a light emission state visible by the subject;
a display controller configured to control display of the dot matrix display unit;
an image processing unit which processes the image generated by the imaging device; and
a pattern storage unit in which a plurality of portrait patterns is pre-stored,
wherein the dot matrix display unit displays a pattern based on the control of the display Controller,
wherein the display controller controls the display of the dot matrix display unit based on the image processed by the image processing unit, and
wherein the display controller selects portrait patterns from the plurality of portrait patterns based on the image processed by the image processing unit and displays the selected portrait patterns on the dot matrix display unit.

12. The imaging apparatus of claim 11, wherein the imaging apparatus has a portrait registration mode in which the portrait patterns are stored in the pattern storage unit based on the image processed by the image processing unit.

13. The imaging apparatus of claim 12, further comprising a voice input unit through which voice is input,
wherein, in the portrait registration mode, the voice input from the voice input unit is stored in the pattern storage unit in association with the portrait patterns.

14. The imaging apparatus of claim 11, wherein the display controller has a self-photographing mode to display a pattern on the dot matrix display unit based on the image processed by the image processing unit.

15. An imaging apparatus, comprising:

an imaging device;

a lens provided in a front part and configured to form an image of a subject on the imaging device;

a dot matrix display unit arranged in the front part, the dot matrix display unit including a plurality of LED chips, each of the plurality of LED chips providing a plurality of dots with a light emission state visible by the subject;

a display controller configured to control display of the dot matrix display unit;

an image processing unit which processes the image generated by the imaging device; and a pattern storage unit in which a plurality of portrait patterns is pre-stored;

wherein the dot matrix display unit displays a pattern based on the control of the display controller, wherein the display controller controls the display of the dot matrix display unit based on the image processed by the image processing unit, wherein the display controller selects portrait patterns from the plurality of portrait patterns based on the image processed by the image processing unit and displays the selected portrait patterns on the dot matrix display unit, wherein the display controller has a self-photographing mode to display a pattern on the dot matrix display unit based on the image processed by the image processing unit, and wherein the image processing unit extracts a facial contour from the image generated by the imaging device, and the display controller controls the dot matrix display unit to display the facial contour.

16. The imaging apparatus of claim 1, further comprising a gravity direction sensor configured to detect gravity direction, wherein the display controller has a self-photographing mode to display an indicator indicating the gravity direction or a horizontal direction perpendicular to the gravity direction on the dot matrix display unit.

17. The imaging apparatus of claim 1, wherein an aspect ratio of the dot matrix display unit is equal to an aspect ratio of the image generated by the imaging device.

18. The imaging apparatus of claim 2, wherein the display controller changes the pattern displayed on the dot matrix display unit during the display of the pattern.

19. The imaging apparatus of claim 2, wherein the display controller generates a gradation in the plurality of dots of the dot matrix display unit.

20. The imaging apparatus of claim 2, wherein the display controller changes brightness of the plurality of dots of the dot matrix display unit continuously in time.

21. The imaging apparatus of claim 2, further comprising a storage unit which stores an image generated by the imaging device, wherein the display controller controls the display of the dot matrix display unit based on the image stored in the storage unit.

22. The imaging apparatus of claim 4, wherein the display controller changes the pattern displayed on the dot matrix display unit during the display of the pattern.

23. The imaging apparatus of claim 4, wherein the display controller generates a gradation in the plurality of dots of the dot matrix display unit.

24. The imaging apparatus of claim 4, wherein the display controller changes brightness of the plurality of dots of the dot matrix display unit continuously in time.

25. The imaging apparatus of claim 4, further comprising a storage unit which stores an image generated by the imaging device, wherein the display controller controls the display of the dot matrix display unit based on the image stored in the storage unit.

26. The imaging apparatus of claim 9, wherein the display controller changes the pattern displayed on the dot matrix display unit during the display of the pattern.

27. The imaging apparatus of claim 9, wherein the display controller generates a gradation in the plurality of dots of the dot matrix display unit.

28. The imaging apparatus of claim 9, wherein the display controller changes brightness of the plurality of dots of the dot matrix display unit continuously in time.

29. The imaging apparatus of claim 9, further comprising a storage unit which stores an image generated by the imaging device, wherein the display controller controls the display of the dot matrix display unit based on the image stored in the storage unit.

* * * * *